United States Patent [19] [11] 4,341,879
Sugio et al. [45] Jul. 27, 1982

[54] POLYPHENYLENE ETHER RESIN COMPOSITION HAVING IMPROVED HEAT STABILITY AND IMPACT STRENGTH

[75] Inventors: Akitoshi Sugio, Ohmiya; Masanobu Masu, Tokyo; Masao Okabe, Abiko; Masatugu Matunaga, Tone; Kozo Ishiyama, Tokyo, all of Japan

[73] Assignee: Mitsubishi Gas Chemical Company, Inc., Japan

[21] Appl. No.: 242,681

[22] Filed: Mar. 11, 1981

[30] Foreign Application Priority Data

Mar. 17, 1980 [JP] Japan ............................ 55/33655
Mar. 17, 1980 [JP] Japan ............................ 55/33656

[51] Int. Cl.$^3$ ............................................. C08K 5/34
[52] U.S. Cl. ................................. 524/91; 524/289; 524/291; 524/222; 524/223; 525/68; 525/92; 525/93; 525/95; 525/132; 525/905
[58] Field of Search ............. 260/45.8 NT, 45.85 B, 260/45.9 NC; 525/68, 92, 93, 95, 132, 905; 524/91, 289, 291, 222, 223

[56] References Cited

U.S. PATENT DOCUMENTS

| 3,250,772 | 5/1966 | Dexter et al. | 260/45.8 NT |
| 3,285,855 | 11/1966 | Dexter et al. | 260/45.85 B |
| 3,584,047 | 6/1971 | Dexter et al. | 260/45.9 NC |
| 3,700,750 | 10/1972 | Yamanouchi et al. | 525/392 |
| 4,097,556 | 6/1978 | Toyama et al. | 525/68 |
| 4,153,644 | 5/1979 | Sugio et al. | 525/52 |
| 4,154,719 | 5/1979 | Abolins et al. | 260/45.8 NT |

Primary Examiner—J. Ziegler
Attorney, Agent, or Firm—Wenderoth, Lind & Ponack

[57] ABSTRACT

A polyphenylene ether resin composition having improved heat stability, said composition comprising a polymer matrix composed of a polyphenylene ether resin and a vinyl aromatic resin, and dispersed in the polymer matrix, at least one compound selected from the group consisting of (1). 2-(3,5-di-$C_1$-$C_{10}$ alkyl-4-hydroxyanilino)-4,6-di-$C_5$-$C_{15}$-alkylthio-1,3,5-triazines, (2). ω,ω'-thiodi($C_2$-$C_6$ polymethylene)-bis[3-(3,5-di-$C_1$-$C_{10}$ alkyl-4-hydroxyphenyl)-polymethylene($C_1$-$C_4$)-carboxylates], (3). N,N'-$C_2$-$C_{10}$ polymethylene-bis[(3,5-di-$C_1$-$C_{10}$ alkyl-4-hydroxyphenyl)-polymethylene($C_1$-$C_4$)carboxamides], and (4). tetrakis-{methylene-[(3,5-di-$C_1$-$C_{10}$ alkyl-4-hydroxyphenyl)-polymethylene($C_1$-$C_4$)carboxylate]}methanes.

26 Claims, No Drawings

POLYPHENYLENE ETHER RESIN COMPOSITION HAVING IMPROVED HEAT STABILITY AND IMPACT STRENGTH

This invention relates to a polyphenylene ether resin composition having improved heat stability. More specifically, it pertains to a polyphenylene ether resin composition having improved heat stability comprising a polyphenylene ether resin and a vinyl aromatic resin.

Polyphenylene ethers are known resins disclosed, for example, in U.S. Pat. Nos. 3,306,874, 3,306,875, 3,257,357, 3,257,358 and 4,011,200. Since polyphenylene ethers having a molecular weight above a certain limit have a high melt viscosity and a high softening point, they are useful in applications which require high heat stability. The impact strength of the polyphenylene ethers, however, is insufficient for commercial applications. Furthermore, in producing molded particles of the polyphenylene ethers, high temperatures are required in the steps of kneading, extrusion and molding, but because their oxidation resistance is not sufficient, extrusion and molding at high temperatures degrade the polyphenylene ethers.

As means for improving the impact strength of polyphenylene ethers, there are known a method comprising mixing a polyphenylene ether with a high-impact polystyrene (see, for example, U.S. Pat. Nos. 3,383,435 and 4,038,343) and a method comprising mixing a polyphenylene ether with the high-impact polystyrene and a rubber (see, for example, U.S. Pat. Nos. 3,660,531 and 4,038,343). According to these methods, polyphenylene ether resin compositions having improved impact strength over the polyphenylene ethers themselves can be provided by dint of the rubber component contained in the polymer chain of the high-impact polystyrene. The resin composition obtained by the latter method contains rubber in addition to the high-impact polystyrene and is therefore expected to show better impact strength than the resin composition obtained by the former method.

These resin compositions containing high-impact polystyrene show a lower softening point than the polyphenylene ethers in addition to having improved impact strength. The lowered softening point makes it possible to lower the extruding and molding temperatures in processing such resin compositions, and the oxidative degradation of these resin compositions will be reduced corresponding to a decrease in these temperatures. The degree of the lowering of the extruding and molding temperatures by a decrease in softening point, however, is remote from that degree of lowering which is sufficient to inhibit oxidative degradation of the resin compositions sufficiently. Furthermore, since molded articles prepared from such resin compositions are used at temperatures substantially irrelevant to the lowering of the softening point, it is also desired to improve the heat stability of such resin compositions.

Various methods for improving the heat stability of polyphenylene ethers by adding various heat stabilizers have been known. These heat stabilizers include, for example, benzoates (U.S. Pat. No. 3,379,875), hexaalkylphosphoric triamides or combinations thereof with other compounds (U.S. Pat. Nos. 3,414,536, 3,420,792, 3,429,850, 3,465,062, 3,472,814, 3,483,271, 3,792,121 and 3,816,562), octa-alkylpyrophosphoramides or combinations thereof with other compounds (U.S. Pat. No. 3,450,670), amines (U.S. Pat. Nos. 3,563,934 and 3,956,423), phosphites or hydrazines (U.S. Pat. No. 3,639,334), alkanolamines (U.S. Pat. No. 3,761,541), arylphosphonic diamides (U.S. Pat. No. 3,792,120), N,N'-di-$\beta$-naphthyl-p-phenylenediamine (U.S. Pat. No. 3,956,423), sterically hindered phenols having a triazine or isocyanuric ring (U.S. Pat. No. 4,154,719), substituted dicarboxylic acid dihydrazides (U.S. Pat. No. 3,954,904), high-molecular-weight phosphites or combinations thereof with other compounds (U.S. Pat. No. 3,952,072), amides (Japanese Patent Publication No. 29748/1969), metal dithiocarbamates (Japanese Pat. Publications Nos. 19395/1970 and 8352/1970), carboxylic acid anhydrides (Japanese Patent Publication No. 29750/1969), phosphites (Japanese Patent Publication No. 29751/1969), sterically hindered phenols having one phenolic hydroxyl group per molecule or combinations thereof with other compounds (Japanese Patent Publications Nos. 43473/1971, 42029/1971, 42030/1971, 42031/1971, 42032/1971, and 42033/1971), sterically hindered phenols having one amide linkage per molecule (Japanese Patent Publication No. 24782/1971), sterically hindered phenols having one ester linkage per molecule (Japanese Patent Publication No. 38623/1973), high-molecular-weight phosphites (Japanese Laid-Open Patent Publications Nos. 23846/1974, 31755/1974 and 40476/1975), and combinations of phosphorous acid amides and boron compounds (Japanese Laid-Open Patent Publication No. 129750/1974).

These numerous heat stabilizers previously proposed have not been conducive to the provision of polyphenylene ether resin compositions having fully satisfactory heat stability, or because of dissipation by volatilization during the extruding and molding operations, they cannot improve heat stability to such an extent as is anticipated from their amounts used. Or they give rise to a problem in molding operations.

It is an object of this invention therefore to provide a polyphenylene ether resin composition having improved heat stability and impact strength.

Another object of this invention is to provide a resin composition comprising a polyphenylene ether resin and a vinyl aromatic resin which has improved heat stability and impact strength.

Still another object of this invention is to provide a polyphenylene ether resin composition having improved heat resistance as a result of including a specified heat stabilizer having a relatively high molecular weight and containing at least two sterically hindered phenol moieties in the molecule.

A further object of this invention is to provide a polyphenylene ether resin composition having improved heat stability and impact strength which can be molded in substantially the same way as is a polyphenylene ether resin composition free from a heat stabilizer.

Yet other objects and advantages of this invention will become apparent from the following description.

In accordance with this invention, these objects and advantages are achieved by a polyphenylene ether resin composition having improved heat stability, said composition comprising a polymer matrix composed of a polyphenylene ether resin and a vinyl aromatic resin, and dispersed in the polymer matrix, at least one compound selected from the group consisting of (1) compounds of the formula

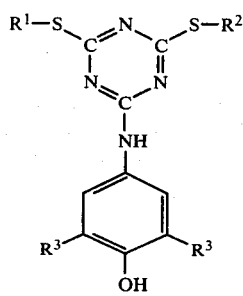

wherein $R^1$ and $R^2$ are identical or different, and each represents an alkyl group having 5 to 15 carbon atoms, and $R^3$ represents an alkyl group having 1 to 10 carbon atoms, (2) Compounds of the formula

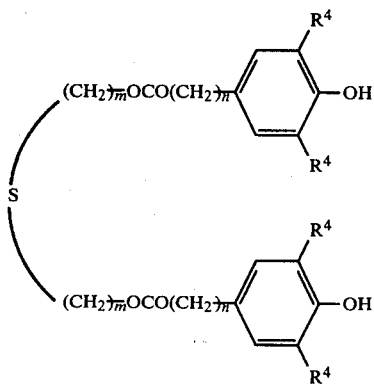

wherein $R^4$ represents an alkyl group having 1 to 10 carbon atoms, n is an integer of 1 to 4 and m is an integer of 2 to 6, (3) compounds of the formula

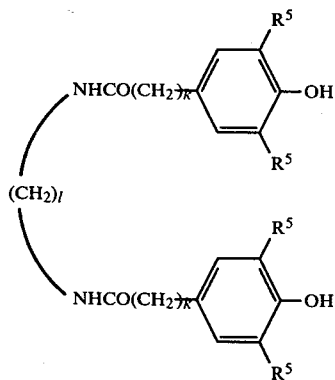

wherein $R^5$ represents an alkyl group having 1 to 10 carbon atoms, k is an integer of 1 to 4, and l is an integer of 2 to 10, and (4) compounds of the formula

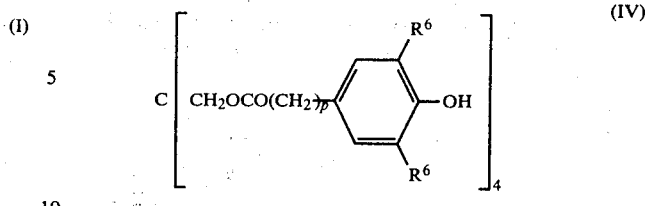

wherein $R^6$ represents an alkyl group having 1 to 10 carbon atoms, and p is an integer of 1 to 4.

According to another aspect, the present invention also provides a polyphenylene ether resin composition having improved heat stability comprising a polymer matrix composed of a polyphenylene ether resin, a vinyl aromatic resin and an elastomer, and dispersed therein, at least one of the compounds of formulae (I) to (IV).

The polyphenylene ether resin forming the polymer matrix in the composition of this invention can be a polyphenylene ether homopolymer or copolymer obtained by polycondensing at least one mononuclear phenol of the formula

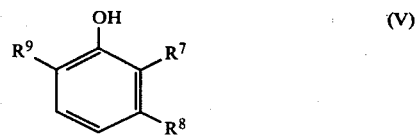

wherein $R^7$, $R^8$ and $R^9$, independently from each other, represent a hydrogen atom or an alkyl group having 1 to 3 carbon atoms, provided that at least one of $R^7$ and $R^9$ is an alkyl group having 1 to 3 carbon atoms, or a grafted polyphenylene ether obtained by graft-polymerizing such a polyphenylene ether with a vinyl aromatic compound.

Methods for producing these polyphenylene ethers are well known per se.

Examples of the mononuclear phenols of general formula (II) include 2,6-dimethylphenol, 2,6-diethylphenol, 2,6-dipropylphenol, 2-methyl-6-ethylphenol, 2-methyl-6-propylphenol, 2-ethyl-6-propylphenol, m-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol, and 2,6-dimethyl-3-propylphenol.

Polyphenylene ethers derived from these mononuclear phenols, therefore, include homopolymers such as poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, and poly(2-ethyl-6-propyl-1,4-phenylene)ether; and copolymers such as a 2,6-dimethylphenol/2,3,6-trimethylphenol copolymer (denotes a polyphenylene ether copolymer derived from 2,6-dimethylphenol and 2,3,6-trimethylphenol; the same manner of expressing polyphenylene ether copolymers is used hereinafter), a 2,6-dimethylphenol/2,3,6-triethylphenol copolymer, a 2,6-diethylphenol/2,3,6-trimethylphenol copolymer and a 2,6-dipropylphenol/2,3,6-trimethylphenol copolymer.

The grafted polyphenylene ethers used equally to these homopolymers and copolymers in this invention are obtained by grafting vinyl aromatic compounds such as styrene, alpha-methylstyrene, vinyltoluene and vinylxylene to these homopolymers or copolymers, and include, for example, a styrene-grafted poly(2,6-dimethyl-1,4-phenylene)ether, and a styrene-grafted 2,6-dimethylphenol/2,3,6-trimethylphenol copolymer.

Preferably, such grafted polymers have a grafting ratio of about 10 to about 50%, especially about 20% to about 40%.

Among these polyphenylene ethers, poly(2,6-dimethyl-1,4-phenylene)ether, a 2,6-dimethylphenol/2,3,6-trimethylphenol copolymer, and grafted polyphenylene ethers obtained by grafting styrene to such polymers are especially preferred for use in this invention.

The polymer matrix in the resin composition of this invention is composed of such a polyphenylene ether resin as described above and a vinyl aromatic resin.

The vinyl aromatic resin may be a resin containing in its polymer chain at least about 25% by weight of a recurring structural unit of the formula

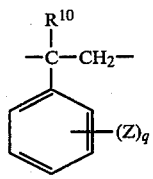
(VI)

wherein $R^{10}$ represents a hydrogen atom or a lower alkyl group, Z represents a halogen atom or a lower alkyl group, and q is 0 or a positive integer of 1 to 3, which is obtained by polymerizing at least one of vinyl aromatic compounds of the following formula

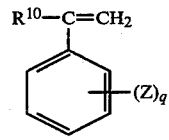

wherein $R^{10}$, Z and q are as defined above.

Lower alkyl groups for $R^{10}$ and Z may be methyl and ethyl groups. The halogen atom for Z may, for example, be chlorine or bromine.

Examples of the vinyl aromatic resin containing at least 25% by weight of the aforesaid recurring structural unit are polystyrene a rubber-modified polystyrene (high-impact polystyrene), a random styrene/butadiene copolymer, a styrene/butadiene/acrylonitrile copolymer, a styrene/acrylonitrile copolymer, a styrene/alpha-methylstyrene copolymer, and a styrene/butadiene block copolymer.

At least one such vinyl aromatic resin can be used in combination with the polyphenylene ether.

The vinyl aromatic resin may be included in the polymer matrix in an amount of preferably not more than 95%, especially preferably not more than 80%.

The elastomer which may be used in this invention is an elastomer in the ordinary sense. Accordingly, the elastomer in this invention, for example, includes polymers having a Young's modulus at ordinary temperature of $10^5$ to $10^9$ dynes/cm$^2$ (0.1 to 1020 kg/cm$^2$), the Young's modulus being defined at pages 71 to 78 of A. V. Tobolsky, "Properties and Structures of Polymers" (John Wiley & Sons, Inc., 1960).

Examples of such an elastomer include polybutadiene, polyisoprene, a nitrile rubber, an ethylene/propylene copolymer, an ethylene/propylene/diene copolymer (EPDM), Thiokol rubbers, polysulfide rubbers, an acrylic rubber, a polyurethane rubber, a grafted product formed between a butyl rubber and polyethylene, polyester elastomers, and copolymers, A-B-A' type block copolymers and A-B'-A' type block copolymers of diene compounds and vinyl aromatic compounds.

In the above, A-B-A' type block copolymers and A-B'-A' type block copolymers, the terminal blocks A and A' are polymer chain blocks of the vinyl aromatic compounds. The central block B in the A-B-A' type block copolymers is a polymer chain block of a conjugated diene, and the central block B' in the A-B'-A' type block copolymers is a block resulting from the hydrogenation of a polymer chain block of a conjugated diene.

In the above description, the diene, diene compound and conjugated diene are used in the same sense, and may, for example, specifically represent, 1,3-butadiene, 2,3-dimethylbutadiene, isoprene, 1,3-pentadiene or a mixture of these. The vinyl aromatic compound may, for example, denote styrene, alpha-methylstyrene, vinyltoluene, vinylxylene, ethylvinylxylene, vinylnaphthalene, or mixtures thereof.

Preferably, the aforesaid A-B-A' type block copolymers or A-B'-A' type block copolymers are used as the elastomer used in this invention. The terminal blocks A and A' of these block copolymers preferably have a number average molecular weight of about 2,000 to about 100,000, and the central blocks B and B' preferably have a number average molecular weight of about 25,000 to about 1,000,000.

The elastomer may be included in the resin composition of this invention in an amount of preferably not more than 20% by weight, especially preferably not more than 10% by weight, based on the polymer matrix.

The resin composition of this invention may contain about 5 to about 95% by weight, especially preferably at least about 20% by weight, based on the polymer matrix, of the polyphenylene ether resin.

The resin composition of this invention contains dispersed in the polymer matrix at least one compound selected from the group consisting of the compounds (1) to (4).

(1) Compounds of the formula

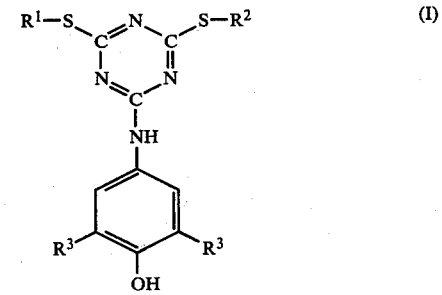
(I)

wherein $R^1$ and $R^2$ are identical or different, and each represents an alkyl group having 5 to 15 carbon atoms, and $R^3$ represents an alkyl group having 1 to 10 carbon atoms;

(2) Compounds of the formula

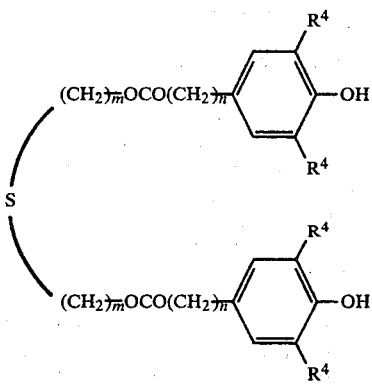

wherein $R^4$ represents an alkyl group having 1 to 10 carbon atoms, n is an integer of 1 to 4 and m is an integer of 2 to 6;

(3) Compounds of the formula

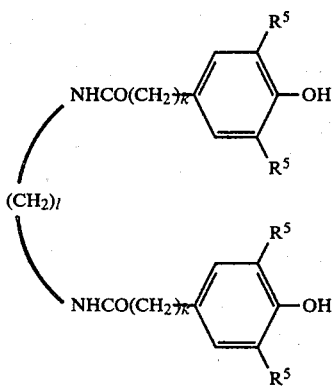

wherein $R^5$ represents an alkyl group having 1 to 10 carbon atoms, k is an integer of 1 to 4, and l is an integer of 2 to 10; and (4) Compounds of the formula

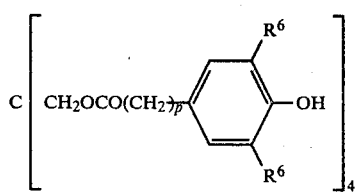

wherein $R^6$ represents an alkyl group having 1 to 10 carbon atoms, and p is an integer of 1 to 4.

The compounds of general formulae (I) to (IV) are characterized in that they are of relatively high molecular weight, and contain at least two sterically hindered phenol moieties in the molecule.

$R^3$ in formula (I), $R^4$ in formula (II), $R^5$ in formula (III) and $R^6$ in formula (IV) are substituents which are located ortho to the phenolic hydroxyl group, all being alkyl groups having 1 to 10 carbon atoms. These alkyl groups may be linear or branched, but branched alkyl groups in which the α-carbon atoms is a tertiary carbon atom are preferred. Examples of these alkyl groups are methyl, ethyl, n-propyl, iso-propyl, n-butyl, sec-butyl, t-butyl, n-pentyl, 1,1-dimethylpropyl, n-hexyl, 1,1-dimethylbutyl, 1-ethyl, and 1-methylpropyl.

Among these, alkyl groups having 4 to 10 carbon atoms in which the α-carbon atom is a tertiary carbon atom are especially preferred, and t-butyl is most preferred.

$R^1$ and $R^2$ in formula (I) are identical or different and each represents an alkyl group having 5 to 15 carbon atoms. Such an alkyl group may be linear or branched, but preferably it is linear. Specific examples of such an alkyl group are partly clear from the specific examples of $R^3$ to $R^6$ given hereinabove, and also include heptyl, octyl, nonyl, decyl and dodecyl. Among these, alkyl groups having 6 to 10 carbon atoms are preferred, and octyl is most preferred.

The compounds of general formula (I) are 2-(3,5-di-$C_1$-$C_{10}$ alkyl-4-hydroxyanilino)-4,6-di-$C_5$-$C_{15}$ alkylthio-1,3,5-triazines. Specific examples of these compounds are 2-(3,5-dimethyl-4-hydroxyanilino)-4,6-di-n-pentylthio-1,3,5-triazine, 2-(3,5-di-tert-butyl-4-hydroxyanilino)-4,6-di-n-hexylthio-1,3,5-triazine, 2-(3,5-di-tert-butyl-4-hydroxyanilino)-4,6-di-n-octylthio-1,3,5-triazine, 2-(3,5-di-tert-butyl-4-hydroxyanilino)-4,6-di-n-decyl-1,3,5-triazine, 2-(3,5-di-tert-butyl-4-hydroxyanilino)-4,6-n-pentadecyl-1,3,5-triazine, and 2-[3,5-di-(1,1-dimethyl-octyl)-4-hydroxyanilino]-4,6-di-n-octylthio-1,3,5-triazine. Among these, 2-(3,5-di-tert-butyl-4-hydroxyanilino)-4,6-di-n-octylthio-1,3,5-triazine is especially preferred.

The compounds of general formula (II) are ω,ω'-thiodi($C_2$-$C_6$ polymethylene)-bis[3-(3,5-di-$C_1$-$C_{10}$ alkyl-4-hydroxyphenyl)-polymethylene ($C_1$-$C_4$)carboxylates]. Specific examples of these compounds are 2,2'-thiodiethyl-bis[3-(3,5-dimethyl-4-hydroxyphenyl)-acetate] 2,2'-thiodiethyl-bis[3-(3,5-di-tert-butyl-4-hydroxyphenyl)-propionate], 2,2'-thiodiethyl-bis[3-(3,5-di-tert-butyl-4-hydroxyphenyl)butyrate], 2,2'-thiodiethyl-bis[3-(3,5-di-tert-butyl-4-hydroxyphenyl)valerate], 3,3'-thiodipropyl-bis[3-(3,5-di-tert-butyl-4-hydroxyphenyl)-propionate], 4,4'-thiodibutyl-bis[3-(3,5-di-tert-butyl-4-hydroxyphenyl)-propionate], 4,4'-thiodihexyl-bis[3-(3,5-di-tert-butyl-4-hydroxyphenyl)-propionate], and 2,2'-thiodiethyl-bis(3-[3,5-di(1,1-dimethyloctyl)-4-hydroxyphenyl]-propionate). Among these, 2,2'-thiodiethyl-bis[3-(3,5-di-tert-butyl-4-hydroxyphenyl)-propionate] is especially preferred.

The compounds expressed by general formula (III) are N,N'-$C_2$-$C_{10}$ polymethylene-bis[(3,5-di-$C_1$-$C_{10}$ alkyl-4-hydroxyphenyl)polymethylene ($C_1$-$C_4$)carboxamides]. Specific examples of these compounds are N,N'-ethylene-bis[(3,5-dimethyl-4-hydroxyphenyl)acetamide], N,N'-trimethylene-bis[(3,5-di-tert-butyl-4-hydroxyphenyl)propionamide], N,N'-hexamethylene-bis[(3,5-di-tert-butyl-4-hydroxyphenyl)propionamide] (i.e., N,N'-hexamethylene-bis(3,5-di-tert-butyl-4-hydroxyhydrocinnamide)), N,N'-decamethylene-bis[(3,5-di-tert-butyl-4-hydroxyphenyl)-propionamide], N,N'-hexamethylene-bis[(3,5-di-tert-butyl-4-hydroxyphenyl)butyramide], and N,N'-hexamethylene-bis[(3,5-di-tert-butyl-4-hydroxyphenyl)valeramide]. Among these, N,N'-hexamethylene-bis[(3,5-di-tert-butyl-4-hydroxyphenyl)propionamide] is especially preferred.

The compounds of formula (IV) are tetrakis-{methylene-[(3,5-di$C_{1-10}$ alkyl-4-hydroxyphenyl)polymethylene ($C_1$-$C_4$)carboxylate]}methanes. Specific examples of these compounds are tetrakis-{methylene-[(3,5-dimethyl-4-hydroxyphenyl)-acetate]}methane, tetrakis-{methylene-[(3,5-di-tert-butyl-4-hydroxyphenyl)acetate]}methane, tetrakis-{methylene-[(3,5-di-tert-butyl-4-hydroxyphenyl)propionate]}methane, (i.e., tetrakis-[methylene-(3,5-di-tert-butyl-4-hydroxyhydrocinnamate)]methane), tetrakis-{methylene-[(3,5-di-tert-butyl-4-hydroxyphenyl)-butyrate]}methane, tetrakis-{methylene-[(3,5-di-tert-butyl-4-hydroxyphenyl)-valerate]}methane, tetrakis-{methylene-[(3,5-di-1,1-dimethylhexyl-4-hyroxyphenyl)propionate]}methane and tetrakis-{methylene-[(3,5-di-1,1-dimethyloctyl-4-hydroxyphenyl)-propionate]}methane. Among these, tetrakis-(methylene-[(3,5-di-tert-butyl-4-hydroxyphenyl)propionate])methane is especially preferred.

The compounds of general formula (I) to (IV) can be produced by methods known per se.

The compounds of formulae (I) to (IV) have relatively high molecular weights, and contain at least one sterically hindered phenol moieties per molecule.

Their relatively high molecular weights make it possible to prevent resin compositions containing these compounds from decreasing in heat distortion temperature, and to take advantage of the inherent excellent thermal stability of polyphenylene ethers in the resin compositions of this invention. Moreover, because of their relatively high molecular weights, these compounds have higher boiling points than sterically hindered phenols having relatively low molecular weights used widely as stabilizers to resins, such as 2,6-di-tert-butyl-p-cresol (BHT). Accordingly, the extent to which these compounds dissipate by volatilization during the extruding and molding operations is extremely low. This naturally leads to the advantage that these compounds of general formula (I) to (IV) exhibit an excellent heat stabilizing effect in a smaller amount than ordinary sterically hindered phenols having a relatively low molecular weight.

That these compounds of formulae (II) to (IV) have at least two sterically hindered phenol moieties per molecule is advantageous because this means that these compounds have many moieties in the molecule which can contribute to heat stabilization. In addition, the compounds of formulae (I) to (IV) in accordance with this invention have moieties which can contribute to heat stabilization, such as a thioether moiety, a triazine, moiety, and amine moiety, an amide moiety, or an ester moiety.

These compounds of formulae (I) to (IV) also have excellent compatibility with an elasticity-developing block portion of a high-impact polystyrene or an elastomeric block copolymer of the A-B-A' or A-B'-A' type, and therefore, exhibit a marked stabilizing effect on the aforesaid block copolymer and the elasticity-developing block portion as compared with BHT, etc. which have been widely used as stabilizers for resins.

The compounds of general formulae (I) to (IV) may be included in an amount of 0.01 to 10 parts by weight, preferably 0.05 to 5 parts by weight, per 100 parts by weight of the polymer matrix.

The compounds of formulae (I) to (IV) may be dispersed alone or as a mixture of two or more in the polymer matrix. When the amount of the stabilizer compound exceeds the specified limit, no further increase in heat stability is noted corresponding to the increase of the stabilizer compound, but rather adverse effects on the various properties of the resin composition, such as a decrease in heat distortion temperature, tend to be exerted. Conversely, when the amount of the stabilizer compound is below the specified limit, it is difficult to achieve an improvement in heat stability as contemplated by the present invention.

The resin composition of this invention may further contain various additives depending upon the intended use. Examples of the additives include lubricants such as olefin waxes typified by polyethylene wax and polypropylene wax; phosphate-type fire retardants typified by triphenyl phosphate or tricresyl phosphate; bromine-type fire retardants typified by decabromobiphenyl, pentabromotoluene or decabromobiphenyl ether; pigments typified by titanium dioxide or zinc oxide; inorganic fillers typified by glass fibers, asbestos, wollastonite, mica or talc; organic fillers typified by carbon fibers; and known stabilizers such as organic phosphites, organic thiophosphites, ordinary sterically hindered phenols, amines, benzoates, metal carbamates and hydrazines.

The polyphenylene ether resin composition of this invention can be easily prepared by known methods for melt-mixing thermoplastic resins. For example, there is generally employed conveniently a method which comprises mixing the polyphenylene ether resin, the vinyl aromatic resin and optionally an elastomer and/or various fillers with a predetermined amount of at least one of the compounds of general formulae (I) to (IV) in a mixer, then fully kneading the mixture in a melt-extruder, and then extruding the resulting uniform molten mass so as to form pellets.

The following Examples and Comparative Examples illustrate the resin composition of this invention specifically. Unless otherwise specified, all parts and percentages in these examples are by weight.

EXAMPLE 1 AND COMPARATIVE EXAMPLE 1

32.5 Parts of poly(2,6-dimethyl-1,4-phenylene ether) having an intrinsic viscosity, measured at 25° C. in chloroform, of 0.56 dl/g, 45.5 parts of high-impact polystyrene (the polystyrene matrix having an intrinsic viscosity, measured at 25° C. in chloroform, of 0.80 dl/g; gel content, 22.4% analyzed by using benzene), 2 parts of a polystyrene/polybutadiene/polystyrene block copolymer [the ratio of the polystyrene block to the polybutadiene block, 30:70; the viscosity of a 20% toluene solution of the copolymer measured at 25° C. by a Brookfield viscometer (Model RVT), 1,500 cps], 2 parts of triphenylphosphate, 3 parts of titanium dioxide and 1 part of 2-(3,5-di-tert.-butyl-4-hydroxyanilino)-4,6-dioctylthio-1,3,5-triazine ("Irganox 565", tradename) were fully mixed by a Henschel mixer. The mixture was kneaded at 240° to 290° C. and pelletized by a twin-screw extruder (AS-30, manufactured by Nakatani Kikai Seisakusho K. K.). The pellets were then injection-molded at 260° to 280° C. and 1,320 kg/cm² by an injection molding machine (SJ-35B, manufactured by Meiki Kikai Seisakusho K. K.) to prepare test specimens.

The notched Izod impact strengths (thickness ⅛ inch), tensile impact strengths (S-type, thickness 1/15 inch) and tensile elongations of the test specimens were measured both at the initial stage and after hot air aging at 120° C. for 100 hours. The results are shown in Table 1.

For comparison, a polyphenylene ether resin composition was prepared in the same way as above except that "Irganox 565" was not used, and the properties of the test specimens were measured under the same conditions as above (Comparative Example 1). The results are also shown in Table 1.

TABLE 1

| | Izod impact strength (kg-cm/cm) | | Tensile impact strength (kg-cm/cm²) | | Elongation (%) | |
|---|---|---|---|---|---|---|
| | Initial | After aging | Initial | After aging | Initial | After aging |
| Example 1 | 16.4 | 12.4 (76%) | 110 | 85 (77%) | 26.3 | 20.7 (79%) |
| Comparative Example 1 | 16.2 | 7.8 (48%) | 160 | 43 (27%) | 33.1 | 4.4 (13%) |

The parenthesized figures in the above and subsequent tables show percent retentions calculated in accordance with the following equation.

$$\text{Percent retention} = \frac{\text{Value obtained after hot air aging}}{\text{Initial value}} \times 100$$

The results given in Table 1 clearly show the improved heat stability of the resin composition of this invention.

EXAMPLES 2 AND 3

A resin composition was produced in the same way as in Example 1 except that 2,2'-thiodiethyl-bis[3-(3,5-di-tert.-butyl-4-hydroxyphenyl)-propionate] (Irganox 1035, a trademark) (Example 2) or N,N'-hexamethylenebis(3,5-di-tert-butyl-4-hydroxyhydrocinnamide) (Irganox 1098, a trademark) (Example 3) was used instead of the Irganox 565 in Example 1. Test specimens were prepared from the resin composition and tested in the same way as in Example 1. The results are shown in Table 2.

TABLE 2

| | Izod impact strength (kg-cm/cm) | | Tensile impact strength (kg-cm/cm²) | | Elongation (%) | |
|---|---|---|---|---|---|---|
| | Initial | After aging | Initial | After aging | Initial | After aging |
| Example 2 | 16.8 | 12.0 (71%) | 144 | 90 (63%) | 25.9 | 21.2 (83%) |
| Example 3 | 15.5 | 11.9 (77%) | 135 | 95 (70%) | 27.3 | 22.4 (82%) |

A comparison of the results given in Table 2 with those of Comparative Example 1 in Table 1 clearly demonstrates the improved heat stability of the resin composition of this invention.

EXAMPLE 4 AND COMPARATIVE EXAMPLE 2

42 Parts of a 2,6-dimethylphenol/2,3,6-trimethylphenol copolymer (the 2,3,6-trimethylphenol content, 5 mole%; intrinsic viscosity measured at 25° C. in chloroform, 0.52 dl/g), 53.5 parts of high-impact polystyrene [the polystyrene matrix having an intrinsic viscosity measured at 25° C. in chloroform, of 0.89 dl/g; the gel content, 12.9% by weight analyzed by using methyl ethyl ketone], 3.5 parts of the same polystyrene/-polybutadiene/polystyrene block copolymer, 1 part of polyethylene wax having an average molecular weight of 9,000, 7 parts of titanium dioxide and 1 part of Irganox 565 (trademark) were fully mixed in a Henschel mixer. The mixture was extruded and pelletized by a thin-screw extruder (AS-30) at 290° C. (the maximum set temperature of the cylinders). The pellets were injection-molded under 1,050 kg/cm² in an injection molding machine (SJ-35B) at 290° C. (the maximum set temperature of the cylinder) to prepare test specimens.

The test specimens were tested for the properties shown in Table 3 before and after they were aged in hot air at 115° C. for 200 hours. The results are shown in Table 3.

For comparison, the above procedure was repeated except that Irganox 565 was not used (Comparative Example 2). The results are also shown in Table 3.

TABLE 3

| | Izod impact strength (kg-cm/cm) | | Tensile impact strength (kg-cm/cm²) | | Elongation (%) | |
|---|---|---|---|---|---|---|
| | Initial | After aging | Initial | After aging | Initial | After aging |
| Example 4 | 18.4 | 12.0 (65%) | 153 | 90 (59%) | 33.7 | 22.8 (68%) |
| Comparative Example 2 | 17.7 | 9.3 (53%) | 172 | 36 (21%) | 34.5 | 15.9 (46%) |

EXAMPLE 5 AND COMPARATIVE EXAMPLE 3

60 Parts of the same polyphenylene ether copolymer used in Example 4, 37 parts of the same high-impact polystyrene as used in Example 4, 2 parts of the same polystyrene/polybutadiene-polystyrene block copolymer as used in Example 1, 1 part of an ethylene/propylene copolymer having a reduced specific viscosity, determined at 135° C. in decalin in a concentration of 0.1 g/100 ml, of 2.0 and a glass transition point of −49° C., 5.8 parts of triphenyl phosphate, 7 parts of titanium dioxide and 3 parts of Irganox 1098 were fully mixed in a Henschel mixer. The mixture was extruded and pelletized by a twin-screw extruder (AS-30) at 290° C. (the maximum set temperature of the cylinders). The pellets were injection-molded under 1,050 kg/cm² at 280° C. (the maximum set temperature of the cylinder) to prepare test specimens. The test specimens were tested for tensile impact strength and tensile elongation under the same conditions as in Example 4. The results are shown in Table 4.

For comparison, the above procedure was repeated except that Irganox 1098 was not used (Comparative Example 3). The results are also shown in Table 4.

TABLE 4

| | Tensile impact strength (kg/cm/cm²) | | Elongation (%) | |
|---|---|---|---|---|
| | Initial | After aging | Initial | After aging |
| Example 5 | 146 | 101 (69%) | 26.5 | 19.3 (73%) |
| Comparative Example 3 | 139 | 69 (50%) | 38.5 | 15.4 (40%) |

EXAMPLE 6 AND COMPARATIVE EXAMPLE 4

52.5 Parts of the same poly(2,6-dimethyl-1,4-phenylene ether) as used in Example 1, 45.5 parts of the same high-impact polystyrene as used in Example 1, 2 parts of the same polystyrene/polybutadiene/polystyrene block copolymer, 2 parts of triphenyl phosphate, 3 parts of titanium dioxide and 1 part of tetrakis-[methylene(3,5-di-tert-butyl-4-hydroxyhydrocinnamate)]methane (Irganox 1010, a trademark) were fully mixed in a Henschel mixer. The mixture was kneaded and extruded by a twin-screw extruder (AS-30) at 290° C. (the maximum set temperature of the cylinder) to form pellets. The pellets were injection-molded under 1,320 kg/cm² by an injection molding machine (SJ-35B) at 280° C. (the maximum st temperature of the cylinder) to prepare test specimens. The test specimens were tested under the same conditions as in Example 1, and the results are shown in Table 5.

For comparison, the above procedure was repeated except that Irganox 1010 was not used (Comparative Example 4). The results are also shown in Table 5.

TABLE 5

| | Izod impact strength (kg-cm/cm) | | Tensile impact strength (kg-cm/cm²) | | Elongation (%) | |
|---|---|---|---|---|---|---|
| | Initial | After aging | Initial | After aging | Initial | After aging |
| Example 6 | 15.7 | 11.2 (71%) | 117 | 84 (72%) | 27.6 | 19.0 (72%) |
| Comparative Example 4 | 16.2 | 7.8 (48%) | 160 | 43 (27%) | 33.1 | 4.4 (13%) |

EXAMPLE 7 AND COMPARATIVE EXAMPLE 5

42 Parts of the same 2,6-dimethylphenol/2,3,6-trimethylphenol copolymer as used in Example 4, 43.5 parts of the same high-impact polystyrene as used in Example 4, 3.5 parts of the same polystyrene/polybutadiene/polystyrene block copolymer as used in Example 1, 1 part of the same ethylene/propylene copolymer as used in Example 5, 7 parts of titanium dioxide and 1 part of Irganox 1010 were fully mixed in a Henschel mixer. The mixture was extruded and pelletized by a twin-screw extruder (AS-30) at 290° C. (the maximum set temperature of the cylinders). The pellets were injection-molded under 1,050 kg/cm² at 290° C. (the maximum set temperature of the cylinder) by an injection molding machine (SJ-35B) to prepare test specimens.

The test specimens were tested for Izod impact strength, tensile impact strength and tensile elongation before and after aging in hot air at 115° C. for 10 days. The results are shown in Table 6.

For comparison, the above procedure was repeated except that Irganox 1-10 was not used (Comparative Example 5). The results are also shown in Table 6.

TABLE 6

| | Izod impact strength (kg-cm/cm) | | Tensile impact strength (kg-cm/cm²) | | Elongation (%) | |
|---|---|---|---|---|---|---|
| | Initial | After aging | Initial | After aging | Initial | After aging |
| Example 7 | 18.1 | 11.7 (65%) | 143 | 75 (52%) | 32.2 | 22.8 (71%) |
| Comparative Example 5 | 19.2 | 9.6 (50%) | 165 | 79 (48%) | 28.8 | 14.3 (50%) |

What we claim is:

1. A polyphenylene ether resin composition having improved heat stability, said composition comprising a polymer matrix composed of a polyphenylene ether resin and a vinyl aromatic resin, and dispersed in the polymer matrix, at least one compound selected from the group consisting of (1) compounds of the formula

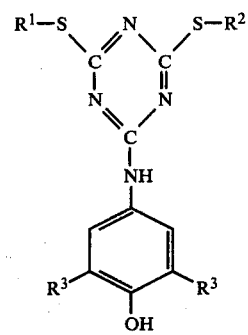

wherein $R^1$ and $R^2$ are identical or different and each represents an alkyl group having 5 to 15 carbon atoms, and $R^3$ represents an alkyl group having 1 to 10 carbon atoms, (2) compounds of the formula

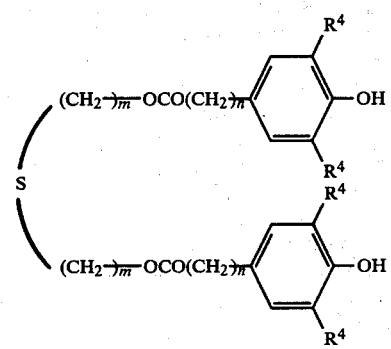

wherein $R^4$ represents an alkyl group having 1 to 10 carbon atoms, n is an integer of 1 to 4, and m is an integer of 2 to 6, (3) compounds of the formula

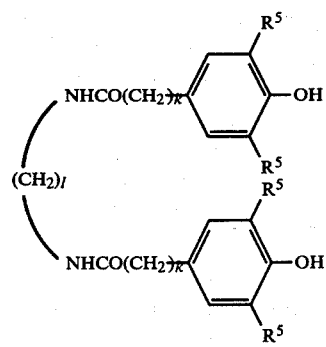

wherein $R^5$ represents an alkyl group having 1 to 10 carbon atoms, k is an integer of 1 to 4, and l is an integer of 2 to 10, and (4) compounds of the formula

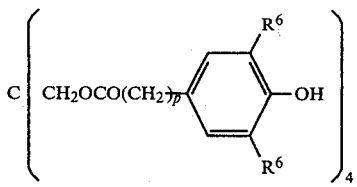

wherein $R^6$ represents an alkyl group having 1 to 10 carbon atoms, and p is an integer of 1 to 4.

2. The composition of claim 1 wherein the polymer matrix further contains an elastomer.

3. The composition of claim 1 wherein the polyphenylene ether resin is a polyphenylene ether homopolymer, copolymer selected from the group consisting of 2,6-dimethylphenol/2,3,6-trimethylphenol, 2,6-dimethylphenol/2,3,6-triethylphenol, 2,6-diethylphenol/2,3,6-trimethylphenol and 2,6-dipropylphenol/2,3,6-trimethylphenol copolymers, or a grafted polyphenylene ether obtained by graft-polymerizing said polyphenylene ether with a vinyl aromatic compound.

4. The composition of claim 3 wherein the vinyl aromatic compound is selected from the group consisting of styrene, alpha-methylstyrene, vinyltoluene and vinylxylene.

5. The composition of claim 1 wherein the polyphenylene ether resin is poly(2,6-dimethyl-1,4-phenylene ether), a polyphenylene ether copolymer derived from 2,6-dimethylphenol and 2,3,6-trimethylphenol, or a grafted polymer obtained by grafting styrene to any of these polyphenylene ethers.

6. The composition of claim 1 wherein the vinyl aromatic resin is a resin containing in its polymer chain at least about 25% by weight of a recurring structural unit of the formula

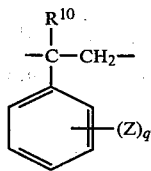

wherein $R^{10}$ represents a hydrogen atom or a lower alkyl group, Z represents a halogen atom or a lower alkyl group, and q is a positive integer of 1 to 3.

7. The resin composition of claim 1 wherein the vinyl aromatic resin is polystyrene, rubber-modified polystyrene, a random styrene/butadiene copolymer, a styrene/butadiene/acrylonitrile copolymer, a styrene/acrylonitrile copolymer, a styrene/alpha-methylstyrene copolymer, or a styrene/butadiene block copolymer.

8. The composition of claim 1 wherein the proportion of the polyphenylene ether resin is about 5 to about 95% by weight based on the polymer matrix.

9. The composition of claim 1 wherein the proportion of the vinyl aromatic resin is not more than about 95% by weight based on the polymer matrix.

10. The composition of claim 2 wherein the elastomer is an elastomeric polymer having a Young's modulus at room temperature of $10^5$ to $10^9/cm^2$.

11. The composition of claim 10 wherein the elastomer is an elastomeric block copolymer of the type

A—B—A' wherein A and A' represent polymer chain blocks of a vinyl aromatic compound, and B represents a polymer chain block of a conjugated diene, or

A—B'—A' wherein A and A' are as defined above, and B' represents a block resulting from hydrogenation of a polymer chain block of a conjugated diene.

12. The composition of claim 11 wherein the vinyl aromatic compound is selected from the group consisting of styrene, alpha-methylstyrene, vinyltoluene, vinylxylene, ethylvinylxylene, vinylnaphthalene and mixtures thereof.

13. The composition of claim 11 wherein the conjugated diene is selected from the group consisting of 1,3-butadiene, 2,3-dimethylbutadiene, isoprene, 1,3-pentadiene and mixtures thereof.

14. The composition of claim 2 wherein the proportion of the elastomer is not more than 20% by weight based on the polymer matrix.

15. The composition of claim 1 wherein in the formula representing the compounds (1), $R^1$ and $R^2$ are linear alkyl groups having 5 to 15 carbon atoms, and $R^3$ is an alkyl group having 4 to 10 carbon atoms in which the alphacarbon atom is a tertiary carbon atom.

16. The composition of claim 1 wherein in the formula representing the compounds (1), $R^1$ and $R^2$ are n-octyl groups and $R^3$ is a tert-butyl group.

17. The composition of claim 1 wherein in the formula representing the compounds (2), $R^4$ is an alkyl group having 4 to 10 carbon atoms in which the alphacarbon atom is a tertiary carbon atom, m is an integer of 2 to 6, and n is 2.

18. The composition of claim 1 wherein in the formula representing the compounds (2), $R^4$ is a tert-butyl group, and m and n are both 2.

19. The composition of claim 1 wherein in the formula representing the compounds (3), $R^5$ is an alkyl group having 4 to 10 carbon atoms in which the alphacarbon atom is a tertiary carbon atom, k is 2, and l is 2 to 10.

20. The composition of claim 1 wherein in the formula representing the compounds (3), $R^5$ is a tert-butyl group, k is 2, and l is 6.

21. The composition of claim 1 wherein in the formula representing the compounds (4), $R^6$ is an alkyl group having 4 to 10 carbon atoms in which the alphacarbon atoms is a tertiary carbon atom, and p is an integer of 1 to 4.

22. The composition of claim 1 wherein in the formula representing the compounds (4), $R^6$ is a tert-butyl group and p is 2.

23. The composition of claim 1 wherein the proportion of said at least one compound selected from the compounds (1), (2), (3) and (4) is 0.01 to 10 parts by weight per 100 parts by weight of the polymer matrix.

24. The composition of claim 23 wherein the proportion of said at least one compound selected from the compounds (1), (2), (3) and (4) is 0.05 to 5 parts by weight per 100 parts by weight of the polymer matrix.

25. The composition according to claims 1 or 2 which consists essentially of said polymer matrix with or without an elastomer, and said at least one compound.

26. The composition according to claim 1 where said at least one compound is that of formula (2), (3) or (4).

* * * * *